United States Patent [19]

Tobin

[11] 4,416,013
[45] Nov. 15, 1983

[54] DISTRIBUTED FEEDBACK LASER EMPLOYING THE STARK EFFECT

[75] Inventor: Mary S. Tobin, Tacoma Park, Md.

[73] Assignee: The United States of America as represented by the Secretary of the Navy, Washington, D.C.

[21] Appl. No.: 325,623

[22] Filed: Nov. 30, 1981

[51] Int. Cl.³ .............................................. H01S 3/08
[52] U.S. Cl. ..................................... 372/96; 372/18; 372/64
[58] Field of Search ...................... 372/96, 18, 20, 64, 372/92

[56] References Cited

U.S. PATENT DOCUMENTS

| | | | |
|---|---|---|---|
| 3,760,292 | 9/1973 | Kogelnik et al. | 372/96 |
| 3,884,549 | 5/1975 | Wang et al. | 372/96 |
| 3,939,439 | 2/1976 | Fletcher et al. | 372/96 |
| 3,970,959 | 7/1976 | Wang et al. | 372/96 |
| 4,002,998 | 1/1977 | Conwell et al. | 378/96 |
| 4,087,764 | 5/1978 | Young | 372/20 |

OTHER PUBLICATIONS

"Transverse Mode Control in a Distributed Feedback Semiconductor Laser", Somekh; *Proc. of IEEE Feb. 1974* pp. 277-278.

"Multiply Resonant Distributed Feedback Lasers", Stoll et al., *IEEE Jour. of Quant. Elect.* vol. QE-12, No. 1, Jan. 1, 1976.

Kogelnik et al., Stimulated Emission in a Periodic Structure, Appl. Phys. Lett., vol. 18, No. 4, p. 152 Feb. 1971.

*Primary Examiner*—William L. Sikes
*Assistant Examiner*—Léon Scott, Jr.
*Attorney, Agent, or Firm*—Robert F. Beers; William T. Ellis; Charles E. Krueger

[57] ABSTRACT

An apparatus and method for producing distributed feedback in a laser. Electrodes, formed on opposite sides of a waveguide cavity, form a spatially periodic electric field in an amplification medium which exhibits the Stark effect. The field induces a modulation in the laser gain function of the medium which produces laser feedback.

9 Claims, 2 Drawing Figures

DISTRIBUTED FEEDBACK LASER EMPLOYING THE STARK EFFECT

BACKGROUND OF THE INVENTION

This invention relates to lasers and more particularly to mirrorless, distributed-feedback lasers (DFB).

Resonance is achieved in a conventional waveguide laser by placing mirrors at the ends of the waveguide and adjusting their separation. Some disadvantages inherent in the use of mirrors are the difficulty of precise alignment and the necessity of periodic replacement. A distributed feedback laser (DFB) eliminates the need for end mirrors. A periodic perturbation within the waveguide produces Bragg scattering so that the incident and reflected waves reinforce each other and allow laser action in the absence of discrete mirrors. The degree to which the incident wave interacts with the periodic perturbation is described by the coupling constant, K. As K increases, laser action may occur at lower gains and/or shorter waveguide lengths.

Heretofore, the only means proposed for producing distributed feedback in a gas waveguide laser was to provide periodic corrugated surfaces along the length of the amplifying medium.

Since the incident wavefront only interacts with the perturbation along the walls of the waveguide, the coupling constant, K, is necessarily small. If the separation between the walls of the waveguide is decreased to increase K, the volume of the amplification medium will also be decreased thereby decreasing the output power of the laser.

OBJECTS OF THE INVENTION

An object of the invention is to increase the coupling constant, K, by creating a periodic perturbation throughout the amplification medium instead of only along the waveguide walls thereby allowing the periodic perturbation to interact with the entire wavefront of the incident radiation.

Further objects of the invention are to attain a high value of K while maintaining high laser output power and to provide means for adjusting the magnitude of the periodic perturbation.

Various other objects and advantages will appear from the following description of one embodiment of the invention, and the novel features will be particularly pointed out hereinafter in connection with the appended claims.

SUMMARY OF THE INVENTION

To achieve the objectives the present invention comprises a unique DFB laser wherein a periodic perturbation throughout the amplification medium creates laser feedback. Means are provided for creating a periodic spatial modulation in the amplitude of the laser gain function having period ($n\lambda/2$) where n is an integer and $\lambda$ is the wavelength of the lasing light. Laser feedback is produced by the partial reflection of the incident wavefront of the lasing light due to the periodic variations in the amplitude of the laser gain function.

DESCRIPTION OF THE PREFERRED EMBODIMENT

Figure 1:
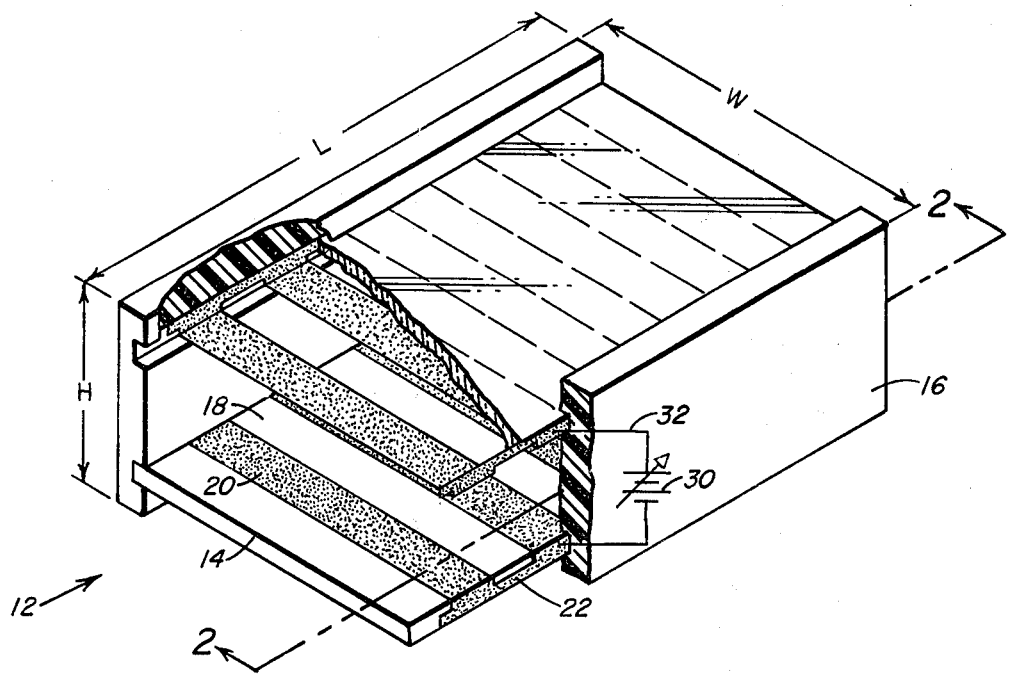
FIG. 1 is a plan view, partly in section, of a preferred embodiment of the invention.
Figure 2:
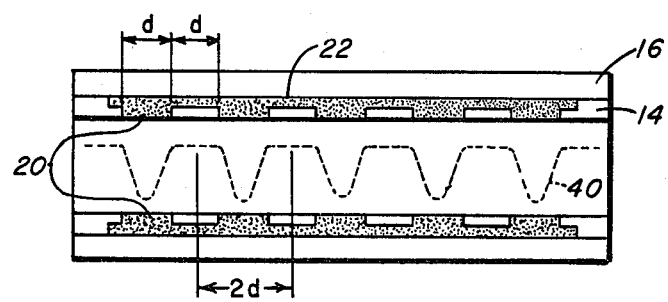
FIG. 2 is a side elevation of the apparatus shown in FIG. 1.

In the embodiment of the invention illustrated in FIGS. 1 and 2, a rectangular waveguide 12 of length L, width W and height H confines an amplification medium within the waveguide cavity 18.

Referring to FIG. 1, the pumping light may enter the waveguide 12 through either end. The pumping source may comprise a CW $CO_2$ laser, for example. It will be understood that other suitable pumping light sources may be employed along with amplification media appropriate for lasing with such light sources or that means other than optical pumping amy be employed to induce a population inversion in the amplification medium as is known in the art.

The wider walls of the waveguide 12 may comprise rectangular plates 14 of a dielectric material, e.g., glass. A series of electrodes comprising rectangular metal strips 20 of width d are positioned on the interior surface of the plate 14. The strips 20 are aligned so that each strip on the upper plate 14 is directly above a strip on the lower plate 14. The metal strips 20 overlap the sides of the plates 14 and are electrically connected by a connecting strip 22 thereby causing all strips on each plate 14 to be at the same potential. The strips may be deposited by photolithographic, microcircuit or other techniques well known in the art. The plates 14 will be joined together by sidewalls 16 which are machined to support the plates 14.

Wires 32 from the variable voltage source 30 are attached to the connecting strips on each plate 14 to impress a potential difference between the electrodes 20.

The remaining structure of the laser, including vacuum fittings and windows, are typical of any gas laser and not special to this invention.

The functioning of the invention will now be described. When a potential difference is impressed upon the electrodes 20, an electric field will be created within the cavity 18 having a magnitude which is much greater in the spaces bounded by the metal strips 20 than in the spaces not bounded by the metal strips 20.

The emission lines of the atoms or molecules in the amplification medium will be split by the application of the electric field; the Stark effect. The splitting of the lines is the result of the electric field removing the degeneracy of the atomic or molecular energy levels and is strongest for molecules having a permanent electric dipole moment, e.g., the submillimeter lasing molecules such as $CH_3CN$, $CH_3OH$, or $CH_3F$. It has been demonstrated by M.S. Tobin and R. E. Jensen in an article entitled "Far ir Laser With Metal-Dielectric Waveguide to Observe the Stark Effect", Applied Optics, Volume 51, No. 9, page 2023 (Sept. 1976) that for these molecules the amplitude of the laser gain function will increase or decrease in the presence of an applied electric field, the change being proportional to the amplitude of the applied electric field. Since the magnitude of the electric field is a maximum in the space bounded by the metal strips 20 and a minimum in the space not bounded by the metal strips 20, the amplitude of the gain will be a spatially periodic function 40 of period 2d (See FIG. 2).

Electromagnetic theory predicts that a wave propagating within the waveguide 12 will be partially reflected due to the gain variations as demonstrated in the article by Kogelnik et al., Stimulated Emission in a Periodic Structure, Appl. Phys. Lett., Vol. 18, No. 4, page 152 (Feb. 1971). If the periodicity of the amplitude function is an integral multiple of one-half the wavelength of the incident wave in the medium, i.e., $2d = n(\lambda/2)$ (Bragg condition), the reflected wave will reinforce the incident wave and distributed feedback resonance will occur. It is also believed that the discontinuity in boundary conditions at the metal strip 20 edges will produce an impedance mismatch and some reflection of the guided incident waves.

The coupling constant, K, between the periodic gain amplitude variation and the incident wave is greater than for a corrugated structure because the entire surface of the incident wave is reflected due to the gain variation but only the section of the wavefront adjacent to the waveguide wall is reflected by the corrugated structure. The magnitude of K in the invention will depend on the magnitude of the gain amplitude variation and will decrease as the magnitude of the electric field between the metal strips 20 decreases. The magnitude of the field between the metal strips 20 will increase if the width of the metal strips 20 is increased and decrease if the separation between the plates 14 is increased. Therefore, in order to achieve large plate separation for both increasing the volume of the amplification medium confined within the waveguide cavity 18 and boosting the output power of the laser the width of the plates must be increased. The width of the metal strips 20 are determined by the wavelength of the lasing light and the order of the mode of the scattering by the Bragg relationship $2d = n(\lambda/2)$ or, solving for d, $d = n(\lambda/4)$. Thus, by increasing n, the width of the metal strips 20 may be increased. By way of illustration, if $\lambda = 0.5$ mm, then the primary mode of reflection (n=1) requires that $d = 0.25$ mm. For a typical low-loss waveguide, if H were much greater than 0.25 mm then the Stark-induced gain modulation would be very small, thereby causing K to be small. If, however, the device were designed to operate at a high-order mode of feedback, e.g., n=40, then the width of the strip 20 would be 5 mm and the field would be adequate up to a plate separation (H) of 5 mm. Thus the invention allows a wide plate separation to accompany a greater volume of amplification medium and to increase the output of the laser as compared with DFB lasers using corrugated sidewalls.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A distributed feedback (DFB) laser comprising:
   an amplification medium for amplifying light at the lasing frequency, said amplification medium being of the type which exhibits the Stark effect;
   means for pumping said medium to generate a population inversion therein, and
   means for producing a spatially varying electric field in said amplification medium of sufficient intensity that an induced Stark effect will produce laser feedback.

2. The DFB laser recited in claim 1, wherein:
   said amplification medium is a gas.

3. The DFB laser recited in claim 2, further comprising:
   a hollow waveguide within which said amplification medium is confined.

4. The DFB laser recited in claim 3, wherein said electric-field-producing means comprises:
   electrode means positioned inside of said waveguide means for producing said electric field within said amplification medium; and
   means for energizing said electrode means.

5. The DFB laser recited in claim 4, wherein said electrode means comprises:
   a plurality of metal strips located on opposing interior surfaces of said waveguide and spaced from each other in a direction substantially parallel to the direction of light propogation through said waveguide.

6. The DFB laser recited in claim 5, wherein:
   said metal strips are separated by a distance equal to $\frac{1}{2} n\lambda$, where n is a positive integer and $\lambda$ is the wavelength of the lasing light.

7. A method of lasing comprising:
   inducing a population inversion in an amplification medium for amplifying light at the lasing frequency, said amplification medium being of the type which exhibits the Stark effect; and
   producing a spatially varying electric field in said amplification medium of sufficient intensity that an induced Stark effect will produce laser feedback.

8. The method recited in claim 7, wherein:
   said amplification medium is a gas.

9. The method recited in claim 7 or 8, wherein:
   said electric field is periodically varying in a direction substantially parallel to the propogation of laser light in said amplification medium and wherein the period of the spatial variation is $\frac{1}{2} n\lambda$, where n is a positive integer and $\lambda$ is the wavelength of the lasing light.

* * * * *